(12) United States Patent  (10) Patent No.: US 7,481,108 B2
Rocky et al.  (45) Date of Patent: Jan. 27, 2009

(54) ROTATABLE MEMBER WITH AN ANNULAR GROOVE FOR DYNAMIC BALANCING DURING ROTATION

(75) Inventors: Drew M. Rocky, Woodbury, CT (US); John F. O'Connor, Jr., New Hartford, CT (US); Russel H. Marvin, Goshen, CT (US)

(73) Assignee: The Bergquist Torrington' Company, Chanhassen, MN (US)

( * ) Notice: Subject to any disclaimer, the term of this patent is extended or adjusted under 35 U.S.C. 154(b) by 0 days.

(21) Appl. No.: 11/923,102

(22) Filed: Oct. 24, 2007

(65) Prior Publication Data
US 2008/0034858 A1  Feb. 14, 2008

Related U.S. Application Data

(62) Division of application No. 10/754,284, filed on Jan. 9, 2004, now Pat. No. 7,305,905.

(51) Int. Cl.
G01M 1/32 (2006.01)
(52) U.S. Cl. ........................ 73/468; 74/572.4
(58) Field of Classification Search .............. 73/455, 73/468; 74/572.4; 416/144; 29/901
See application file for complete search history.

(56) References Cited

U.S. PATENT DOCUMENTS 2,052,295 A * 8/1936 Hume .................. 73/480
2,432,659 A 12/1947 Criswell
2,937,613 A 5/1960 Larsh
3,584,971 A 6/1971 Ortolano
3,997,280 A 12/1976 Germain
5,201,850 A 4/1993 Lenhardt et al.
5,595,391 A 1/1997 Rivin
5,810,527 A 9/1998 Jager et al.
5,845,542 A 12/1998 Hannah et al.
5,857,360 A 1/1999 Kim et al.
5,992,232 A 11/1999 Saitoh
6,053,678 A 4/2000 D'Andrea
6,082,151 A 7/2000 Wierzba et al.
6,958,870 B1 10/2005 Nguyen
6,976,827 B2 12/2005 Bruno et al.
2005/0150322 A1 7/2005 Rocky et al.

* cited by examiner

Primary Examiner—John E Chapman
(74) Attorney, Agent, or Firm—Haugen Law Firm PLLP

(57) ABSTRACT

A method is provided for balancing a rotating member having an annular balancing groove which is configured to receive and retain a balancing projectile. The method includes determining a circumaxial imbalance location, and firing a balancing projectile in timed relationship with the rotation of the member so that the balancing projectile enters the groove at the imbalance location. Such steps are repeated as required to cure additional points of imbalance.

4 Claims, 5 Drawing Sheets

ROTATABLE MEMBER WITH AN ANNULAR GROOVE FOR DYNAMIC BALANCING DURING ROTATION

CROSS-REFERENCE TO RELATED APPLICATION

This is a divisional application of U.S. patent application Ser. No. 10/754,284 filed on Jan. 9, 2004 now U.S. Pat. No. 7,305,905 and entitled "A ROTATABLE MEMBER WITH AN ANNULAR GROOVE FOR DYNAMIC BALANCING DURING ROTATION", the content of which is herein incorporated in its entirety.

BACKGROUND OF THE INVENTION

Manual dynamic balancing of rotatable members is still common practice with the member being rotated to determine the points of unbalance, the rotation stopped to attach weights manually, and the member perhaps rotated a second time to check the balance. Obviously, this is a tedious and time-consuming procedure. Attempts at automation have not been widely successful.

U.S. Pat. No. 2,432,659 to Criswell first determines the locations requiring added weight and then sprays "small particles of metal" repeatedly until the member is balanced.

U.S. Pat. No. 2,937,613 discloses firing a "Body" at a groove in a rotating member but does not disclose any means for capturing and retaining the "Body".

U.S. Pat. No. 3,968,769 to Gusarov et al. projects glue onto the circumaxial locations requiring balancing.

U.S. Pat. No. 5,992,232 to Saitoh ejects a liquid balancing agent, which requires curing.

Patent application Ser. No. 10/788,106 (now U.S. Pat. No. 7,231,822) entitled Machine and Method for Balancing a Member During Rotation, the content at which is hereby incorporated by reference, discloses a system similar to the foregoing patents but which fires projectiles of metal or the like at a rotating member for balancing the same. The system is highly efficient but requires a means of capturing the projectiles and positively retaining the same at the desired circumaxial locations.

The foregoing patents are hereby incorporated herein by reference.

It is the general object of the present invention to provide projectile capturing and retaining means on a rotating member in a simple and efficient manner.

SUMMARY OF THE INVENTION

In fulfillment of the foregoing object and in accordance with the present invention, an annular groove is provided in a member to be balanced and has a cross sectional configuration slightly smaller than that of the projectile at least after impact in at least one direction of measurement so as to engage and capture the projectile for retention in the groove. The groove may retain the projectile frictionally or, preferably, the projectile may be retained by positive engagement of the groove wall therewith. This condition may result from a groove design wherein the mouth of the groove is narrower than the interior with at least one mouth-defining portion of the groove wall being flexible for entry of the projectile to the interior of the groove. Preferably, the side of the mouth opposite the flexible portion is inclined from the line of flight of the projectile in the range of 10-55 degrees whereby to direct errant projectiles into the groove, and more specifically approximately 30 degrees. Once the projectile has entered the groove, the flexible portion of the groove wall engages and positively clamps the same therein. Alternatively, positive retention of a projectile in a groove may be provided for with a relatively soft projectile, which expands on impact within a groove so as to become larger than the mouth of the groove.

Once captured in a groove it is of course important that unintended or accidental circumaxial movement of the projectiles along the groove be positively prevented. To meet this need, small transverse ribs are provided in a spaced circumaxial series and one or more ribs may be partially deformed on impact whereby to provide the necessary retention of the projectiles at the specific locations required for balancing the rotatable member.

Examples of rotatable members which can be advantageously balanced with the aid of a balancing groove of the invention are air impellers and small electric motors. Centrifugal air impellers and small permanent magnet D.C. motors are specifically discussed herein below.

Finally, a method of balancing employing projectiles fired at rotating members is also discussed below.

DETAILED DESCRIPTION OF THE PREFERRED EMBODIMENTS

Figure 1:
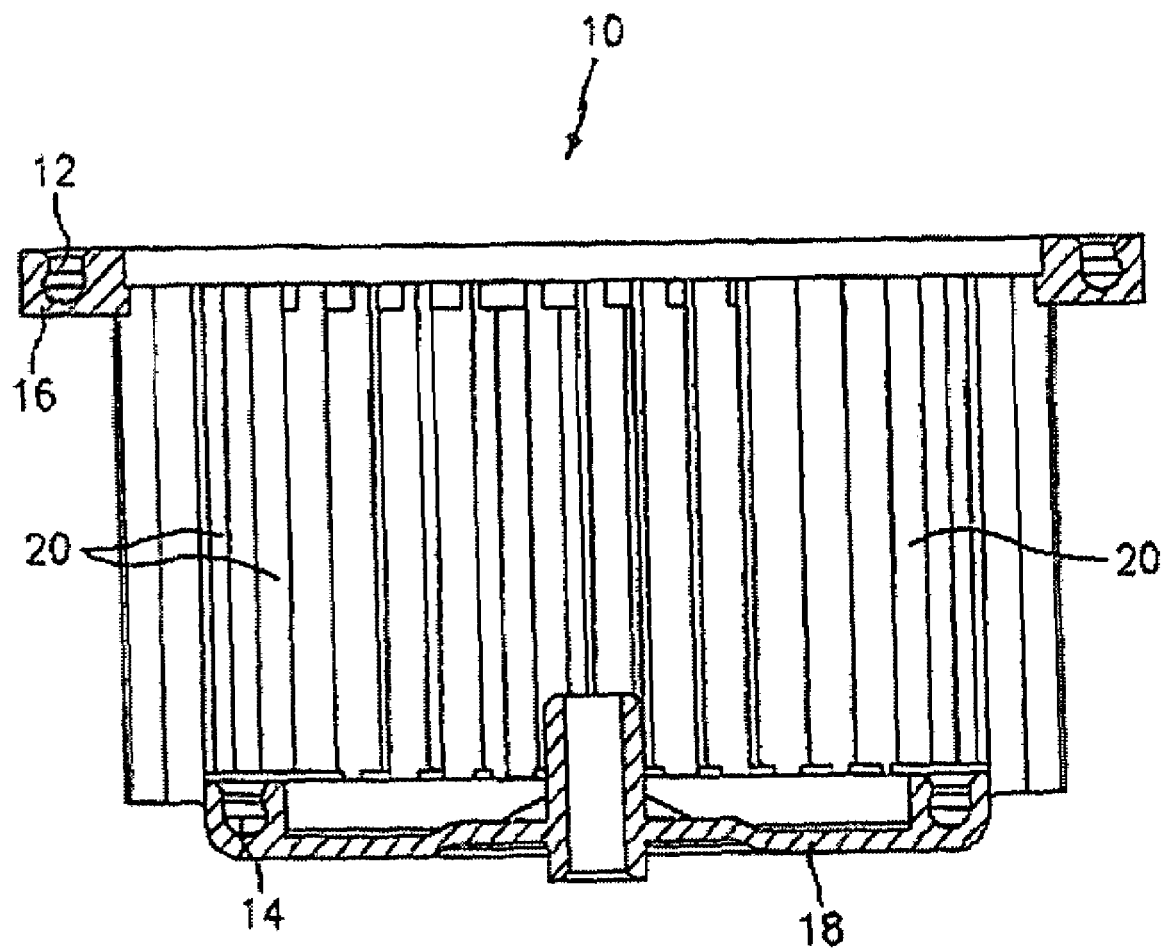
FIG. 1 of the drawings illustrates a centrifugal air impeller partially in section provided with a pair of balancing grooves in accordance with the invention.
Figure 2:
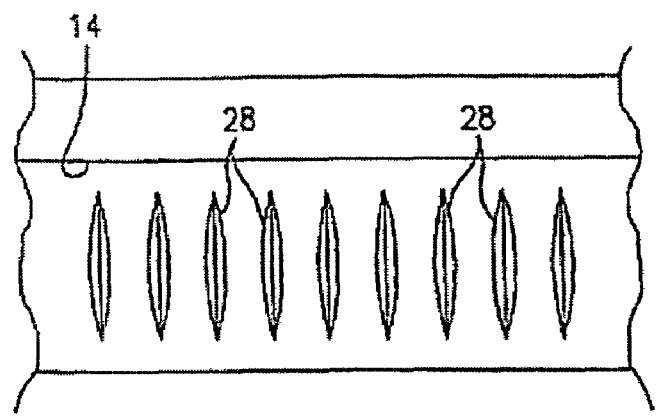
FIG. 2 is an enlarged fragmentary top view partially in section of a balancing groove.

Referring particularly to FIG. 1, it will be observed that a centrifugal air impeller indicated generally at 10 is provided with a pair of annular balancing grooves 12 and 14 respectively in end ring 16 and back plate 18. Parallel circumaxially spaced longitudinally extending air moving blades 20, 20 interconnect the end ring 16 and the back plate 18. The grooves 12 and 14 may be identical in construction and are best illustrated in FIGS. 2 and 3.

Figure 3:
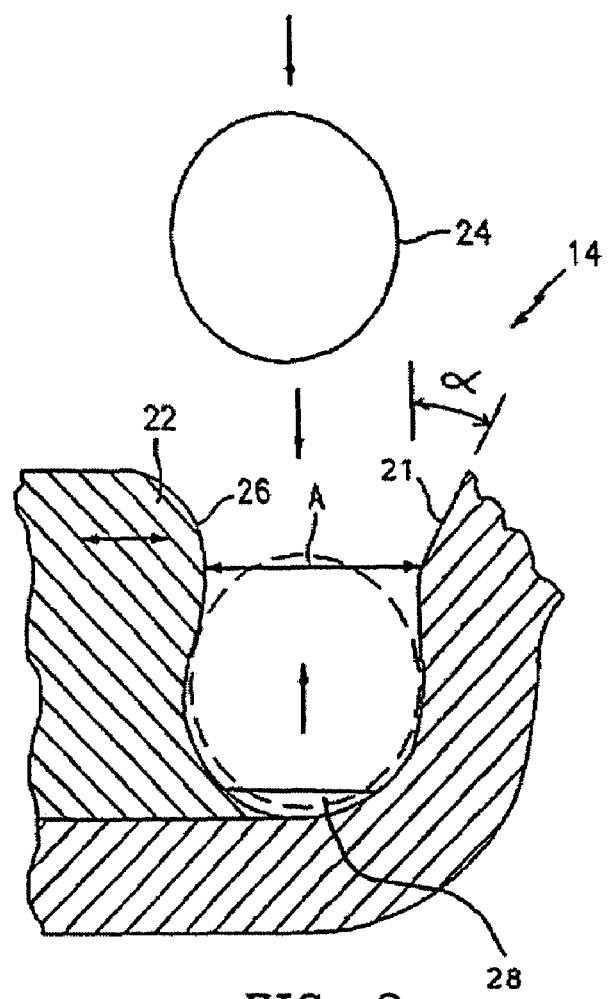
FIG. 3 is an enlarged cross sectional view of a balancing groove with a projectile in flight and about to enter the groove.

Referring particularly to FIG. 3 it will be observed that the mouth of the groove 14 at A is somewhat narrower than the interior. A left hand wall portion or lip 22 would tend to block entry of a projectile larger than A but is flexible so as to bend leftwardly sufficiently to allow the projectile to pass and assume the broken line position in the interior of the groove as shown. In the broken line position the projectile is engaged by the lip as it returns to its normal position and a clamping force is exerted by the lip on the projectile urging it against the opposite wall of the groove. Thus, the projectile is captured and positively retained in the groove.

Still referring to FIG. 3, the wall portion 21 of the groove opposite the lip 22 is shown inclined toward the interior of the groove at an angle α with the line of flight of the projectile. The purpose of this inclined portion is to direct errant projectiles into the groove and the angle of inclination from the projectile line of flight should fall in the range of 10 to 55 degrees. Preferably the angle should be approximately 30 degrees. It should also be noted that the lip 22 has a shallow arcuate surface 26 facing inwardly so as to be engaged by projectiles causing the lip to flex outwardly and opening the mouth for projectile entry.

Figure 4:
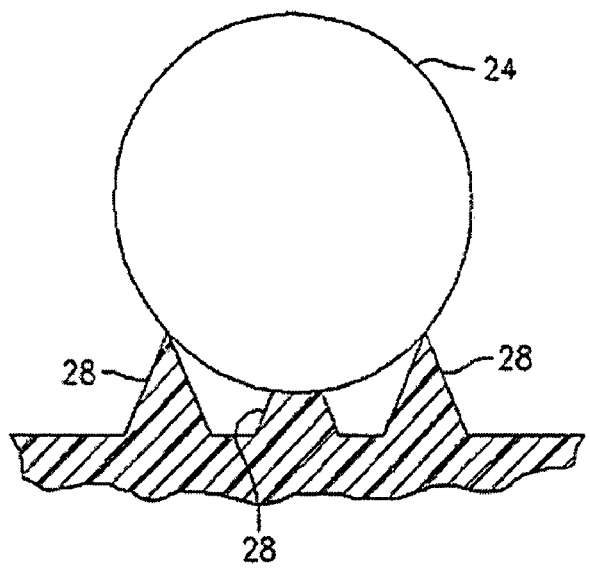
FIG. 4 is an enlarged fragmentary longitudinal section of a groove showing a plurality of transverse ribs engaging and retaining a projectile against movement along the groove.

Further in accordance with the present invention, anti-rotation ribs 28, 28 are provided to retain projectiles in the groove against accidental or inadvertent movement along the groove. As best illustrated in FIGS. 3 and 4, a plurality of ribs 28, 28 are provided in circumaxially spaced relationship along the base of each groove. A projectile such as 24 in FIG. 4 may partially crush a single rib as shown or it may rest between two ribs perhaps partially crushing each. In either event the projectile is restrained against movement along the groove.

In the embodiment of the invention thus far described, the air impeller and thus the balancing groove are of molded plastic construction and the projectile is of metallic construction, the latter actually taking the form of a conventional BB of the type fired from a child's toy rifle. Alternatively, both elements may be of metallic construction or, as will be seen, a relatively soft material may be employed for the projectile and a somewhat harder material for the groove wall.

Figure 5:
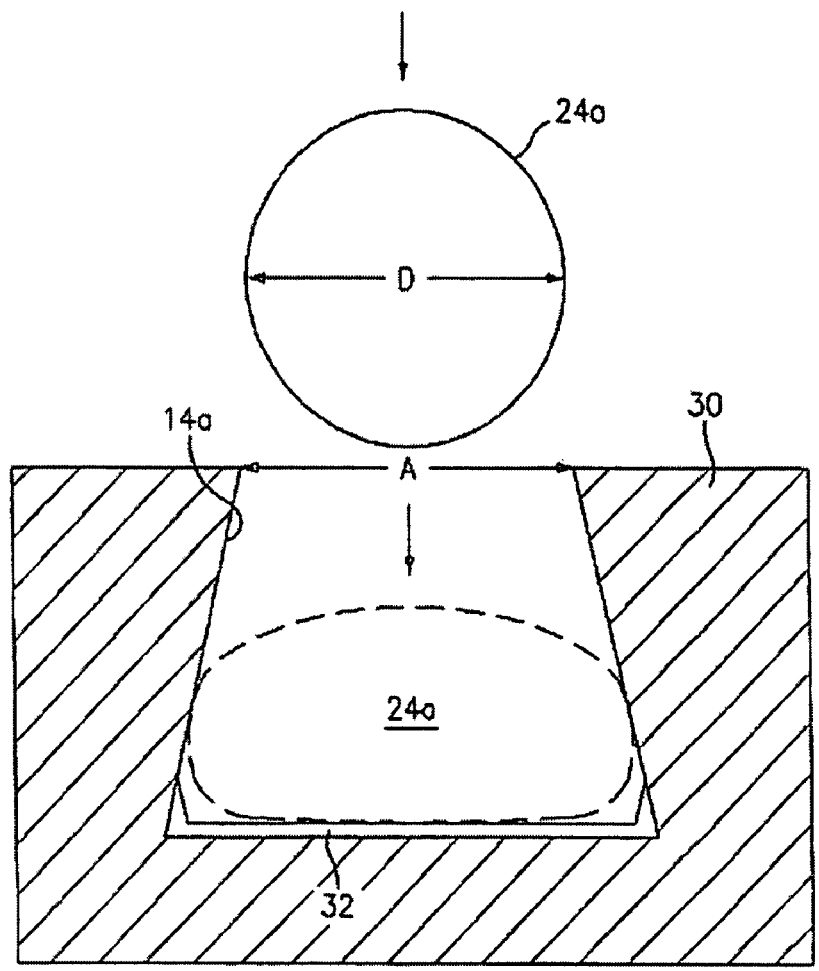
FIG. 5 is an enlarged fragmentary cross sectional view of a groove and projectile of an alternative embodiment of the invention.

FIG. 5 illustrates an alternative embodiment of the invention wherein a relatively soft material such as plastic or lead is used for the projectile 24a and a somewhat harder material such as steel is used for the groove walls 30. The projectile in this instance should be slightly smaller than the mouth A of the groove 14a. Thus, the projectile freely enters the groove and on impact with the rear wall of the groove deforms slightly so as to flatten somewhat and engage the sidewalls of the groove which are inclined to make the rear of the groove wider that its mouth. As will be apparent, the projectile is thus captured and positively held in the groove at the desired location. A series of small ribs 32, 32 may be provided as above to retain the projectile in position circumaxially.

Figure 6:
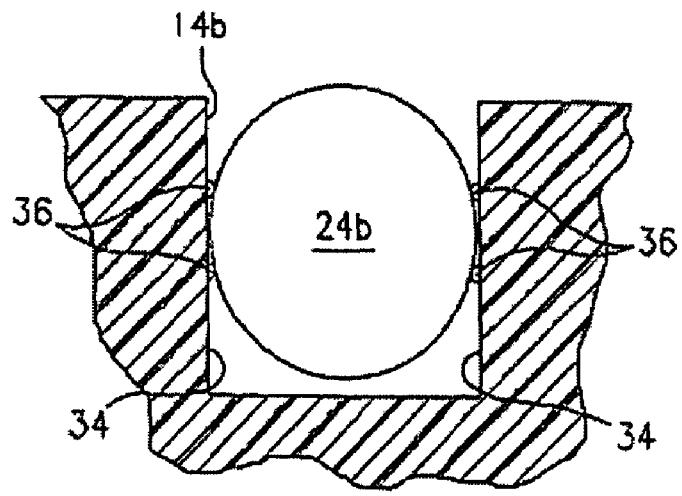
FIG. 6 is a view of still another embodiment of the invention.

A further alternative embodiment of the invention is shown in FIG. 6. A groove 14b has walls 34, 34 which incline inwardly from the mouth of the groove to engage a projectile with progressively greater force as it proceeds into the groove. This of course results in a substantial frictional retaining force against withdrawal of the projectile fro the groove. To enhance this retaining force small longitudinally extending ribs 36, 36 may be provided on the sidewalls 34, 34. The ribs may be slightly deformed by the projectile to provide a hybrid frictional and positive retention of the projectile.

Figure 7:
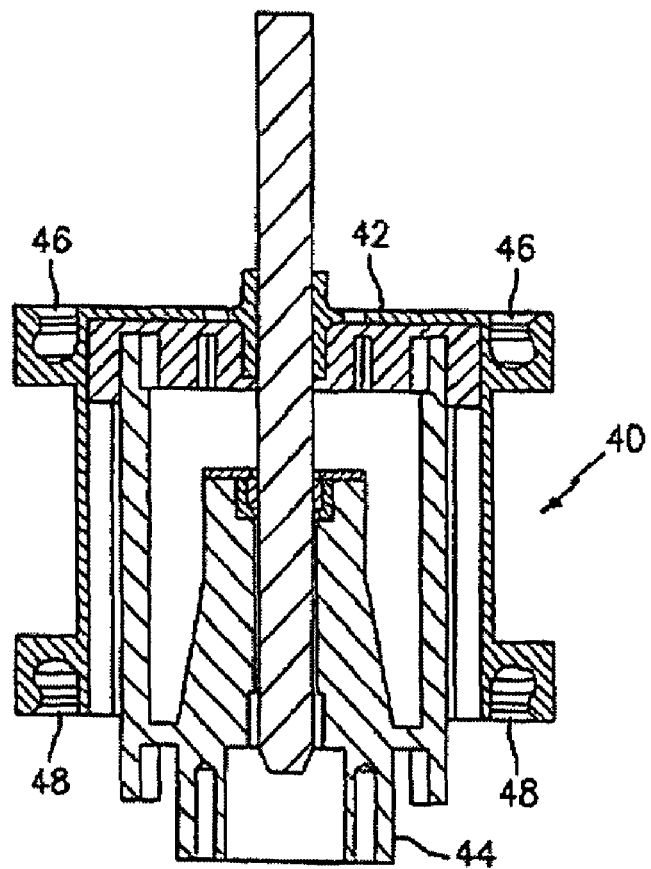
FIG. 7 is a view in partial cross section of a small electric motor provided with a pair of balancing grooves.

A further application of balancing grooves is illustrated in FIG. 7. Small electric motor 40 which may be of the permanent magnet DC type, has an external rotor 42 and a stator 44. Depending on the axial dimension of the rotor, one or two balancing grooves may be required. As shown, two grooves 46, 48 are provided at opposite sides of the rotor and face in opposite directions. The grooves 46, 48 may be identical and they may also be identical with the above-described grooves 12 and 14 on the air impeller of FIG. 1.

Figure 8:
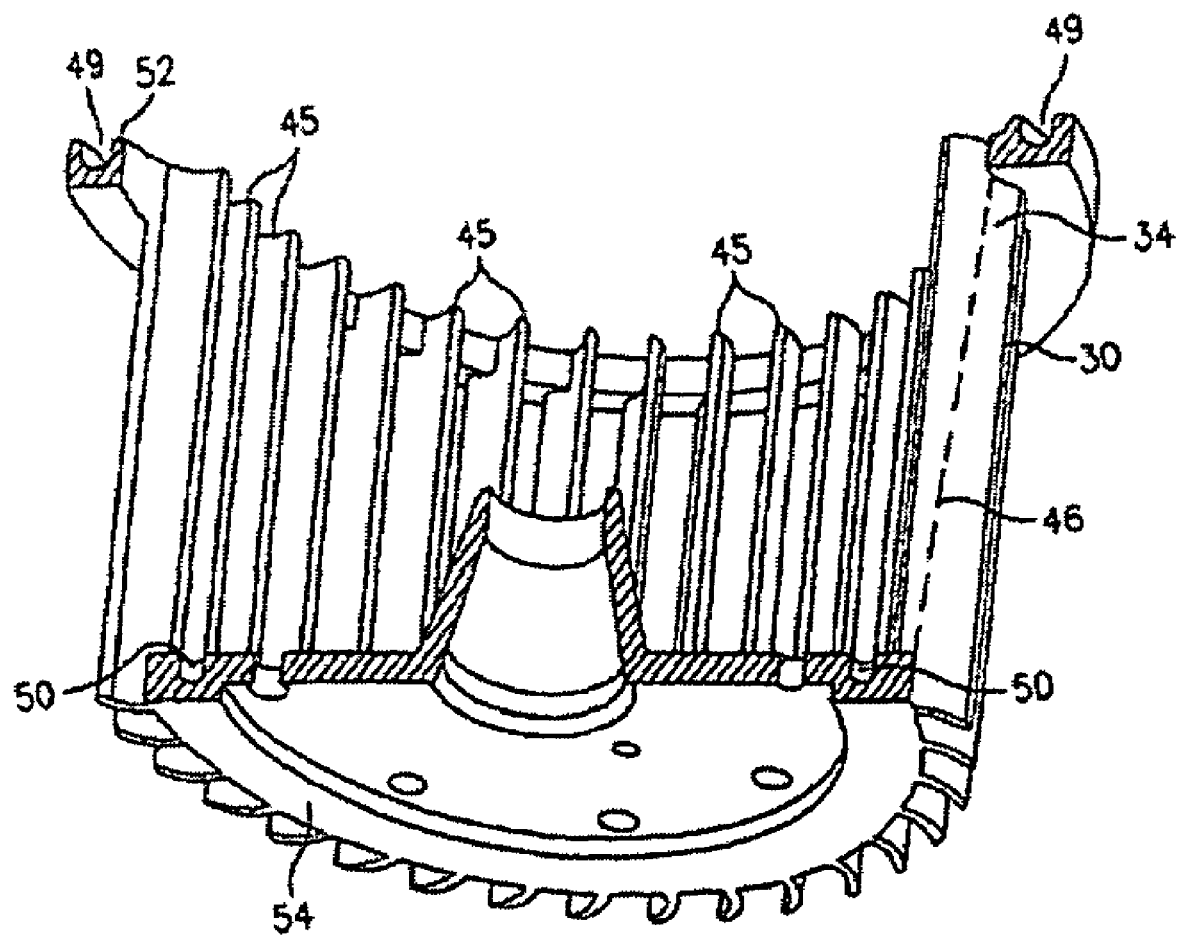
FIG. 8 is a fragmentary perspective view of a centrifugal air impeller having a specific blade, end ring and back plate construction and which is provided with balancing grooves in its end ring and back plate.

FIG. 8 illustrates the application of balancing grooves to a specific design of a centrifugal air impeller fully disclosed in U.S. patent application Ser. No. 10/700,308, entitled "INJECTION MOLDED CENTRIFUGAL AIR IMPELLER" filed Oct. 31, 2003, hereby incorporated herein by reference. The impeller design emphasizes the provision of a mold parting line at an intermediate longitudinal portion of blades 45, 45 as shown by the broken line 46. Balancing grooves 49, 50 are provided respectively at end ring 52 and back plate 54 and may be identical with the grooves of FIG. 1. The end ring 52 is considerably enlarged relative to the end ring of the aforementioned patent application to accommodate the balancing groove 49.

Finally, the general method of balancing a rotating member as set forth in the aforementioned patent applications incorporated herein by reference is greatly enhanced by the addition of a balancing groove. Thus, an improved method in accordance with the invention comprises providing an annular balancing groove in a member requiring balancing, determining a location where a balancing weight is needed, firing a projectile in timed relationship with the rotation of the member so that the projectile enters the groove at the predetermined location, and repeating the foregoing steps as required to cure additional points of imbalance.

What is claimed is:

1. A method for balancing a rotating member comprising the steps of providing an annular balancing groove in the member which is configured to receive and retain a balancing projectile, said annular balancing groove having a mouth portion that is narrower than an interior portion of said annular balancing groove, and at least one mouth-defining wall portion being flexible for entry of the projectile into the interior of the groove; determining a circumaxial imbalance location, firing a balancing projectile in timed relationship with the rotation of the member so that the balancing projectile enters the groove at said imbalance location; repeating the foregoing steps as required to cure additional points of imbalance.

2. A method for balancing a rotating member as set forth in claim 1 wherein a flexible lip is provided at one side of the mouth of the groove and the groove is so configured and dimensioned that the lip engages the projectile after entry and exerts a clamping force to positively retain the projectile in the groove.

3. A method for balancing a member during rotation comprising the steps of providing a means for securing in position one or more balancing projectiles fired at the member, determining balancing weight and location required for balancing the member, including determining the balancing positions of two or more projectiles which will balance the member where a single balancing projectile exhibits a projectile weight unequal to said balancing weight, at least one of said positions being spaced circumaxially from the point of imbalance, and firing two or more projectiles at the positions which will balance the member while said member is rotating.

4. A method for balancing a member during rotation as set forth in claim 3 wherein the balancing weight required to balance the member is determined to be less than that of said projectile weight.

* * * * *